R. M. SPENCER.
JOINT.
APPLICATION FILED MAR. 28, 1921.

1,433,860.

Patented Oct. 31, 1922.

WITNESSES
R. E. Rousseau

INVENTOR
Raphael M. Spencer,
BY
Munn & Co
ATTORNEYS

Patented Oct. 31, 1922.

1,433,860

UNITED STATES PATENT OFFICE.

RAPHAEL M. SPENCER, OF ROY, MONTANA.

JOINT.

Application filed March 28, 1921. Serial No. 456,434.

*To all whom it may concern:*

Be it known that I, RAPHAEL M. SPENCER, a citizen of the United States, and a resident of Roy, in the county of Fergus and State of Montana, have invented certain new and useful Improvements in Joints, of which the following is a specification.

This invention relates to a joint, and more particularly to the type of joint in which a threaded male member is received by a threaded female member, such as commonly employed in connecting a drill and stem.

The object of the invention is to provide means for positively locking the male and female members against turning movement with respect to each other after their ends have been brought to abutting position.

Other objects will hereinafter appear.

Figure 1:
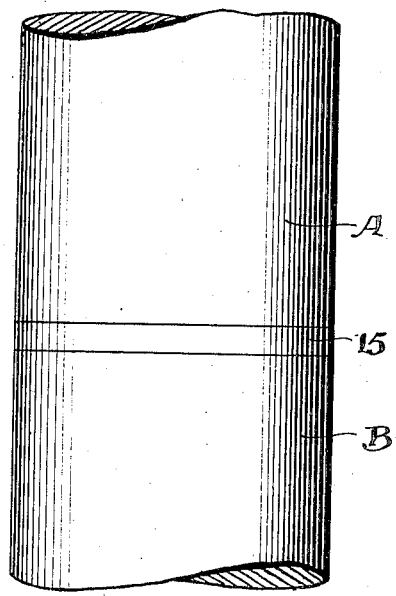
Figure 2:
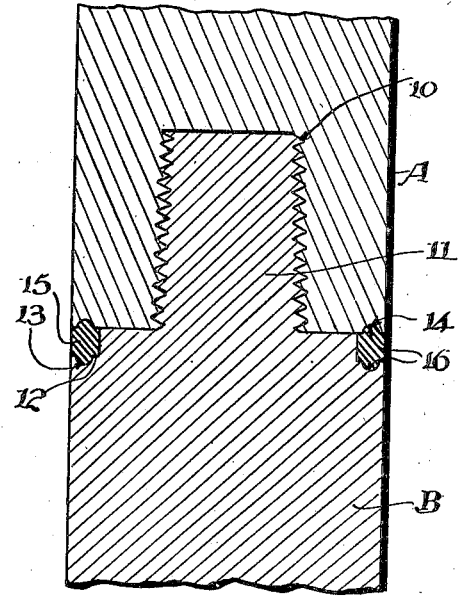
Figure 3:
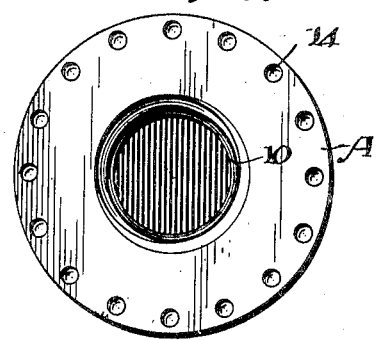
Figure 4:
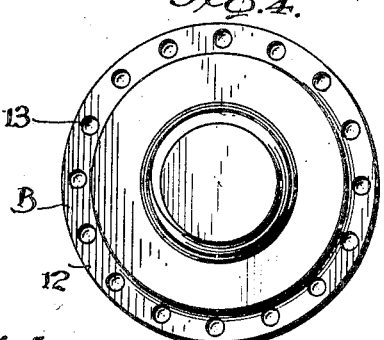
Figure 5:
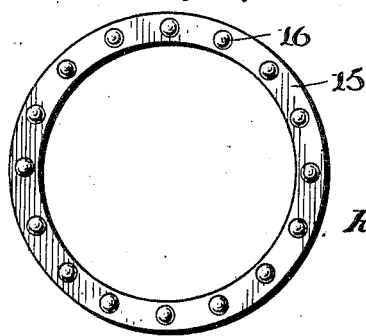

The invention is illustrated by way of example in the accompanying drawings, in which Figure 1 is a side elevation showing a fragmentary portion of a male and female member when connected, Figure 2 is a vertical cross section of the male and female members shown in Figure 1, and also showing in section the manner in which they are positively locked against turning movement with respect to each other, Figures 3 and 4 are end elevations of the adjoining ends of the female and male members, respectively, Figure 5 is a side elevation of the locking ring, as when removed.

Referring to the drawings more particularly, A indicates generally the female member of a joint, and B the male member thereof. In case the members were used for connecting a drill to the stem, the member A would represent the stem, and B the drill. The female member A has the usual central threaded opening 10 which is adapted to receive the threaded extension 11 formed on the male member B. The extension 11 is slightly tapered and likewise the threaded opening 10, as shown. The face of member B is formed with an offset 12, and in the surface of said offset there is formed a plurality of circumferentially spaced recesses 13 which are preferably hemispherical in shape, as shown. The corresponding edge of the abutting face of the member A is also provided with a plurality of circumferentially arranged recesses 14 which are complemental to the recesses 13. After the members A and B have been screwed together so that their opposing faces abut each other, then solder or babbitt in its moulten state is poured within the recess formed by the offset 12. The solder or babbitt will of course also fill the different recesses 13 and 14 formed in the abutting edges of the members B and A respectively. After the solder or babbitt sets, the metal will form a ring 15 similar to that shown in Figure 5. The ring will have formed on each side thereof, a series of projections 16 which would be similar in shape to the recesses 13 and 14. These projections would naturally cooperate with the recesses 13 and 14 to form a positive lock against turning movement of the members A and B. The ring 15 being formed of a soft-like metal of course can be easily broken or cut, and withdrawn from the recess formed by the offset 12 when it is desired to uncouple the members A and B.

While I have shown and described my invention for use in connection with a particular joint, I wish it to be understood that I am aware of the fact that the same might be used in connection with other joints for a similar purpose with like advantages, and that I may therefore not be limited to the particular use described and shown.

I claim:

1. A joint, comprising a female and male member connected by cooperating threads, said male member having an offset formed in its abutting face, and the female member having a series of indentations formed in its abutting face in registering position with the offset whereby when moulten metal is poured therein and set, the two members are positively locked against turning movement with respect to one another.

2. A joint, comprising in combination, a male and female member connected by cooperating threads, said male member having an offset formed at its outer edge and a series of circumferentially arranged indentations in the surface of said offset and also the female member having a like series of indentations formed in its abutting face which registers with the surface of the offset whereby when moulten metal is poured into the recess formed by the offset and becomes set a lock is formed between the female and male member for positively holding them against turning movement with respect to each other.

RAPHAEL M. SPENCER.